United States Patent
Kusumba et al.

(10) Patent No.: US 9,890,778 B2
(45) Date of Patent: Feb. 13, 2018

(54) METHOD FOR OPERATING A LINEAR COMPRESSOR

(71) Applicant: General Electric Company, Schenectady, NY (US)

(72) Inventors: Srujan Kusumba, Louisville, KY (US); Gregory William Hahn, Louisville, KY (US); Michael Lee McIntyre, Louisville, KY (US); Mohammad Taghi Mohebbi, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 195 days.

(21) Appl. No.: 14/931,986

(22) Filed: Nov. 4, 2015

(65) Prior Publication Data

US 2017/0122309 A1     May 4, 2017

(51) Int. Cl.
| | |
|---|---|
| *F04B 51/00* | (2006.01) |
| *F04B 49/06* | (2006.01) |
| *F04B 53/14* | (2006.01) |
| *F04B 53/16* | (2006.01) |
| *F04B 17/03* | (2006.01) |

(Continued)

(52) U.S. Cl.
CPC .............. *F04B 51/00* (2013.01); *F04B 17/03* (2013.01); *F04B 49/06* (2013.01); *F04B 49/20* (2013.01); *F04B 53/14* (2013.01); *F04B 53/16* (2013.01); *F25B 1/02* (2013.01); *F25B 31/023* (2013.01); *F25D 11/02* (2013.01); *F25D 11/022* (2013.01); *F04B 35/045* (2013.01); *F04B 49/065* (2013.01); *F04B 49/12* (2013.01);

(Continued)

(58) Field of Classification Search
CPC ......... G05B 15/02; G05B 17/02; H02P 25/06; H02P 25/062; H02P 25/064; H02K 41/02; F04B 49/06; F04B 49/065; F04B 49/12; F04B 49/20; F04B 35/045; F04B 2203/0401; F04B 2201/0206
See application file for complete search history.

(56) References Cited

U.S. PATENT DOCUMENTS 5,342,176 A * 8/1994 Redlich ................ F04B 35/045
                                                         318/687
5,598,076 A * 1/1997 Neubauer .............. B25J 9/161
                                                         318/568.13

(Continued)

OTHER PUBLICATIONS

A New Robust Integral of Sign of Error Feedback Controller with Adaptive Compensation Gain, by Bidikli, published 2013.*

(Continued)

*Primary Examiner* — Charles Freay
*Assistant Examiner* — Thomas Fink
(74) *Attorney, Agent, or Firm* — Dority & Manning, P.A.

(57) ABSTRACT

A method for operating a linear compressor includes measuring a current induced in a motor of the linear compressor and calculating an observed current of the motor of the linear compressor using at least an electrical dynamic model for the linear compressor and a robust integral of the sign of the error feedback. The method also includes detecting a head crash within the linear compressor if an error between the observed current of the motor of the linear compressor and the measured current induced in the motor of the linear compressor is greater than a crash threshold.

14 Claims, 8 Drawing Sheets

(51) Int. Cl.
| | |
|---|---|
| *F04B 49/20* | (2006.01) |
| *F25B 1/02* | (2006.01) |
| *F25D 11/02* | (2006.01) |
| *F25B 31/02* | (2006.01) |
| *F04B 49/12* | (2006.01) |
| *H02P 25/062* | (2016.01) |
| *F04B 35/04* | (2006.01) |
| *G05B 17/02* | (2006.01) |

(52) U.S. Cl.
    CPC ........... *F04B 2201/0206* (2013.01); *F04B 2203/0401* (2013.01); *G05B 17/02* (2013.01); *H02P 25/062* (2016.02)

(56) References Cited

U.S. PATENT DOCUMENTS

| | | | | |
|---|---|---|---|---|
| 6,289,680 | B1* | 9/2001 | Oh | F04B 49/065 417/45 |
| 6,811,380 | B2 | 11/2004 | Kim | |
| 7,020,595 | B1* | 3/2006 | Adibhatla | G05B 23/0254 700/30 |
| 7,439,692 | B2* | 10/2008 | Lee | F04B 35/045 318/119 |
| 7,456,592 | B2* | 11/2008 | Yoo | F04B 35/045 318/119 |
| 7,497,146 | B2* | 3/2009 | Clausin | F16F 15/18 192/48.8 |
| 8,784,069 | B2* | 7/2014 | Lilie | F04B 35/045 318/135 |
| 2002/0150477 | A1* | 10/2002 | Hwang | F04B 35/045 417/44.1 |
| 2003/0099550 | A1* | 5/2003 | Kim | F04B 35/045 417/44.11 |
| 2003/0161734 | A1* | 8/2003 | Kim | F04B 35/045 417/44.1 |
| 2003/0201745 | A1* | 10/2003 | Hayashi | G05B 13/025 318/561 |
| 2004/0005222 | A1* | 1/2004 | Yoshida | F04B 35/045 417/44.11 |
| 2004/0108824 | A1* | 6/2004 | Ueda | H02P 25/032 318/114 |
| 2004/0169480 | A1* | 9/2004 | Ueda | B26B 19/282 318/114 |
| 2006/0228224 | A1* | 10/2006 | Hong | F04B 35/045 417/44.1 |
| 2006/0251524 | A1* | 11/2006 | Yoo | F04B 35/045 417/53 |
| 2007/0095073 | A1* | 5/2007 | Tian | F04B 35/045 62/6 |
| 2007/0196214 | A1* | 8/2007 | Bocchiola | F04B 35/045 417/44.1 |
| 2007/0241697 | A1* | 10/2007 | Sung | F04B 35/045 318/135 |
| 2007/0241698 | A1* | 10/2007 | Sung | F04B 35/045 318/135 |
| 2009/0004026 | A1* | 1/2009 | Yoo | F04B 35/045 417/44.11 |
| 2009/0097987 | A1* | 4/2009 | Sung | F04B 35/045 417/44.11 |
| 2010/0047079 | A1* | 2/2010 | Reinschke | H02P 25/032 417/44.1 |
| 2013/0189119 | A1* | 7/2013 | Dainez | F04B 35/045 417/45 |
| 2013/0243607 | A1* | 9/2013 | Dainez | F04B 49/00 417/1 |
| 2014/0333236 | A1* | 11/2014 | Yamanaka | H02K 41/031 318/135 |

OTHER PUBLICATIONS

The Scientist & Engineer's Guide to Digital Signal Processing, by Smith, published 1999.*

* cited by examiner

METHOD FOR OPERATING A LINEAR COMPRESSOR

FIELD OF THE INVENTION

The present subject matter relates generally to linear compressors, such as linear compressors for refrigerator appliances.

BACKGROUND OF THE INVENTION

Certain refrigerator appliances include sealed systems for cooling chilled chambers of the refrigerator appliances. The sealed systems generally include a compressor that generates compressed refrigerant during operation of the sealed systems. The compressed refrigerant flows to an evaporator where heat exchange between the chilled chambers and the refrigerant cools the chilled chambers and food items located therein.

Recently, certain refrigerator appliances have included linear compressors for compressing refrigerant. Linear compressors generally include a piston and a driving coil. A current is induced in the driving coil that generates a force for sliding the piston forward and backward within a chamber. During motion of the piston within the chamber, the piston compresses refrigerant. Motion of the piston within the chamber is generally controlled such that the piston does not crash against another component of the linear compressor during motion of the piston within the chamber. Such head crashing can damage various components of the linear compressor, such as the piston or an associated cylinder.

While head crashing is preferably avoided, it can be difficult to determine a position of the piston within the chamber. For example, parameters of the linear compressor can vary due to material and/or production differences. In addition, utilizing a sensor to measure the position of the piston can require sensor wires to pierce a hermetically sealed shell of the linear compressor. Passing the sensor wires through the shell provides a path for contaminants to enter the shell.

Accordingly, a method for detecting head crashing within a linear compressor would be useful. In particular, a method for detecting head crashing within a linear compressor that does not require a sensor to determine a position of the piston would be useful.

BRIEF DESCRIPTION OF THE INVENTION

The present subject matter provides a method for operating a linear compressor. The method includes measuring a current induced in a motor of the linear compressor and calculating an observed current of the motor of the linear compressor using at least an electrical dynamic model for the linear compressor and a robust integral of the sign of the error feedback. The method also includes detecting a head crash within the linear compressor if an error between the observed current of the motor of the linear compressor and the measured current induced in the motor of the linear compressor is greater than a crash threshold. Additional aspects and advantages of the invention will be set forth in part in the following description, or may be apparent from the description, or may be learned through practice of the invention.

In a first exemplary embodiment, a method for operating a linear compressor is provided. The method includes supplying a motor of the linear compressor with a time varying voltage, measuring a current induced in the motor of the linear compressor during the step of supplying and calculating an observed current of the motor of the linear compressor using at least an electrical dynamic model for the linear compressor and a robust integral of the sign of the error feedback. The method also includes determining an error between the observed current of the motor of the linear compressor and the measured current induced in the motor of the linear compressor and detecting a head crash within the linear compressor if the error between the observed current of the motor of the linear compressor and the measured current induced in the motor of the linear compressor is greater than a crash threshold.

In a second exemplary embodiment, a method for operating a linear compressor is provided. The method includes supplying a motor of the linear compressor with a time varying voltage, measuring a current induced in the motor of the linear compressor during the step of supplying, filtering the measured current induced in the motor of the linear compressor and calculating an observed current of the motor of the linear compressor using at least an electrical dynamic model for the linear compressor and a robust integral of the sign of the error feedback. The method also includes determining an error between the observed current of the motor of the linear compressor and the measured current induced in the motor of the linear compressor, obtaining a moving average of the error between the observed current of the motor of the linear compressor and the measured current induced in the motor of the linear compressor and detecting a head crash within the linear compressor if the moving average of the error between the observed current of the motor of the linear compressor and the measured current induced in the motor of the linear compressor is greater than a crash threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
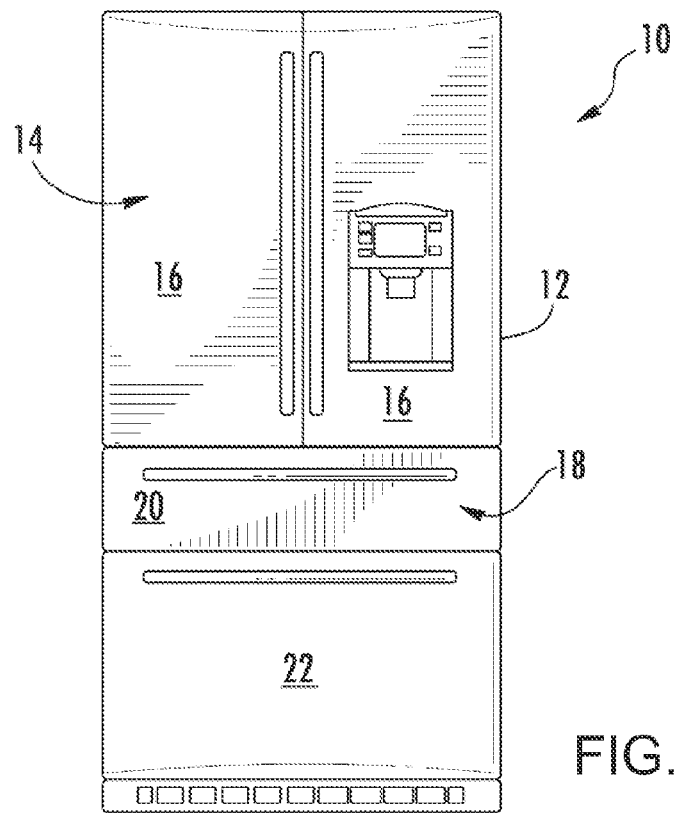
FIG. 1 is a front elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
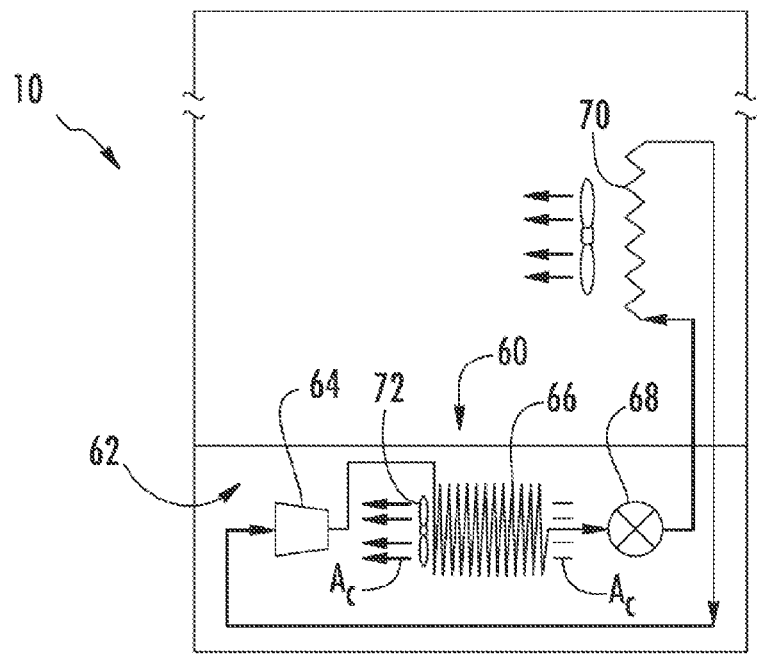
FIG. 2 is schematic view of certain components of the exemplary refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
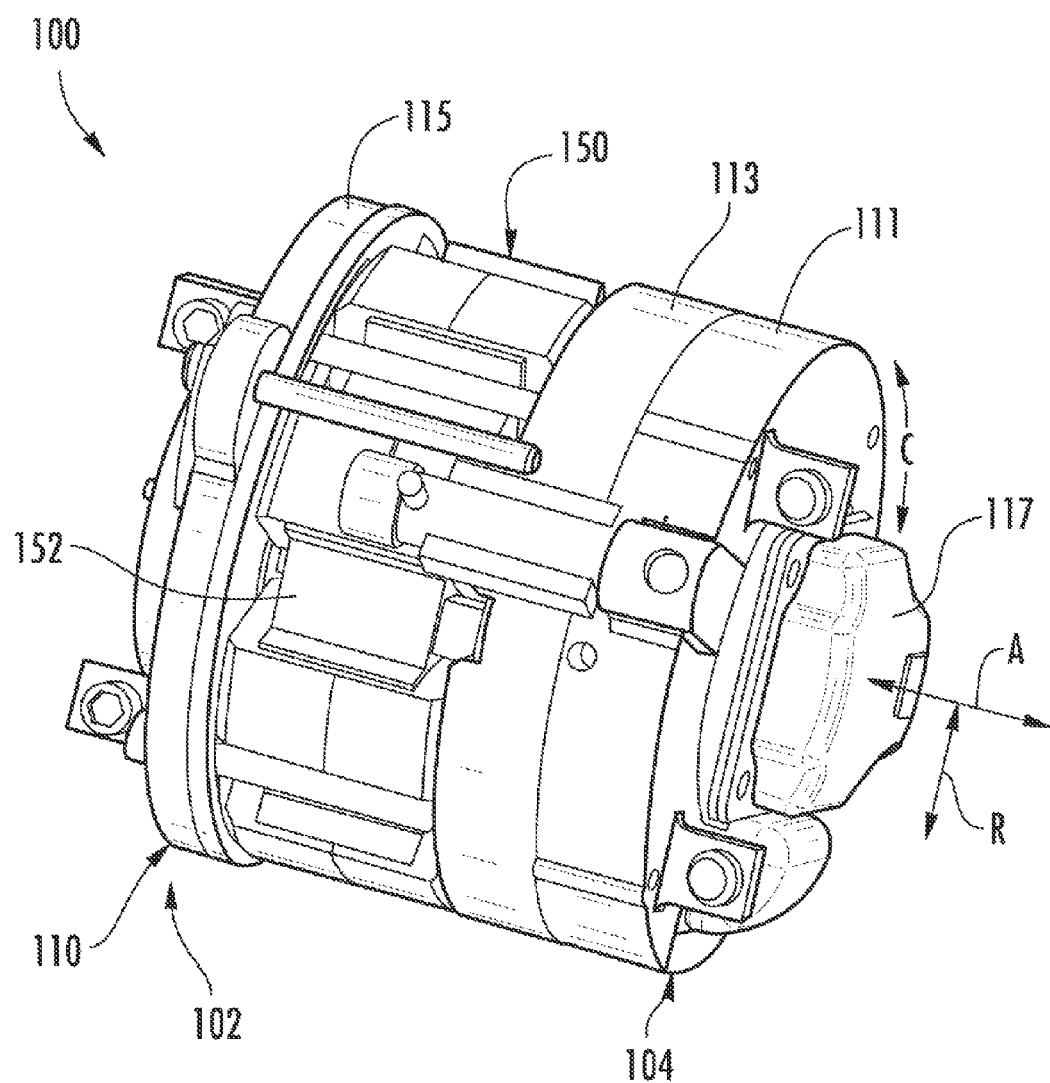
FIG. 3 provides a perspective view of a linear compressor according to an exemplary embodiment of the present subject matter.
Figure 4:
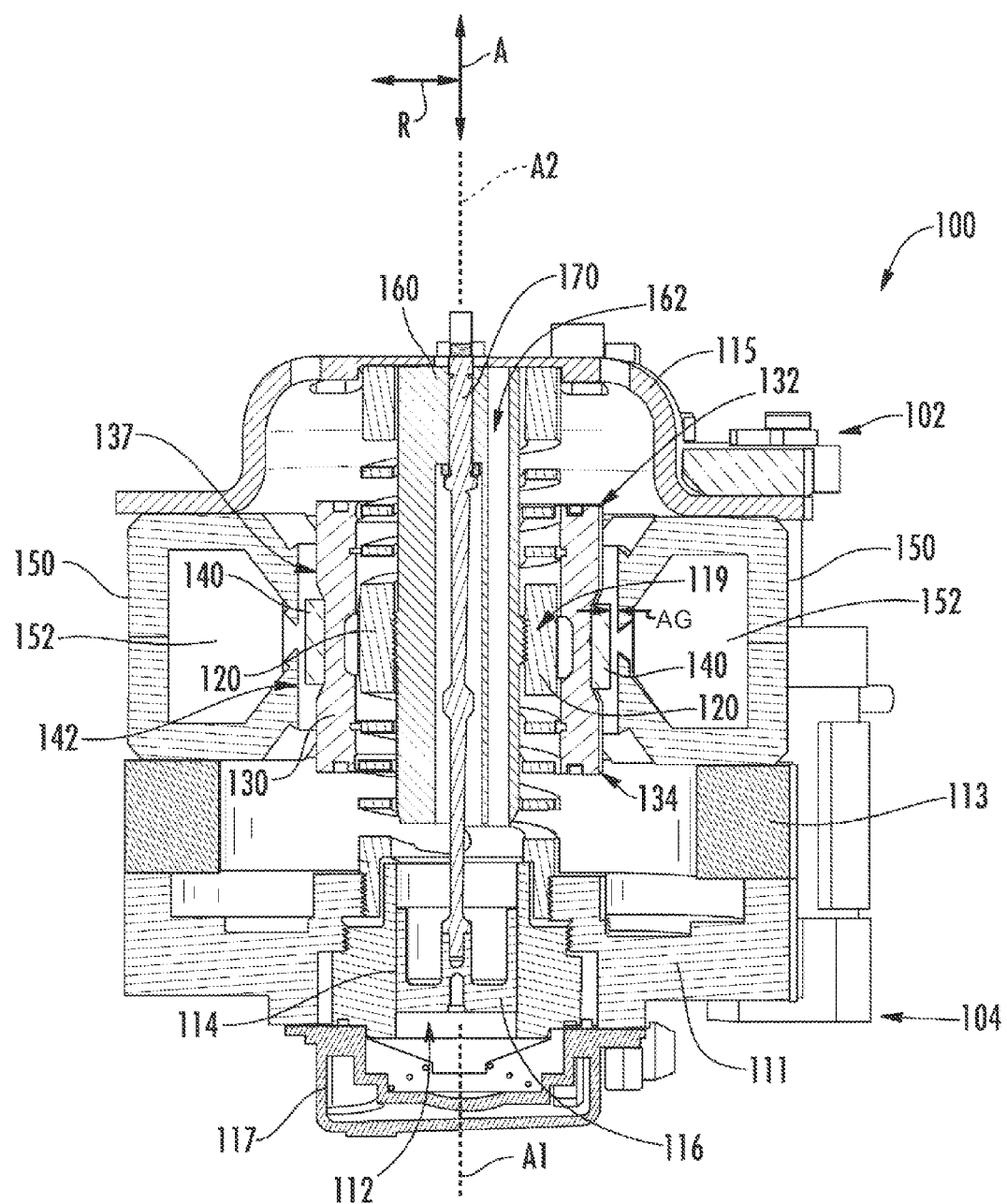
FIG. 4 provides a side section view of the exemplary linear compressor of FIG. 3.
Figure 5:
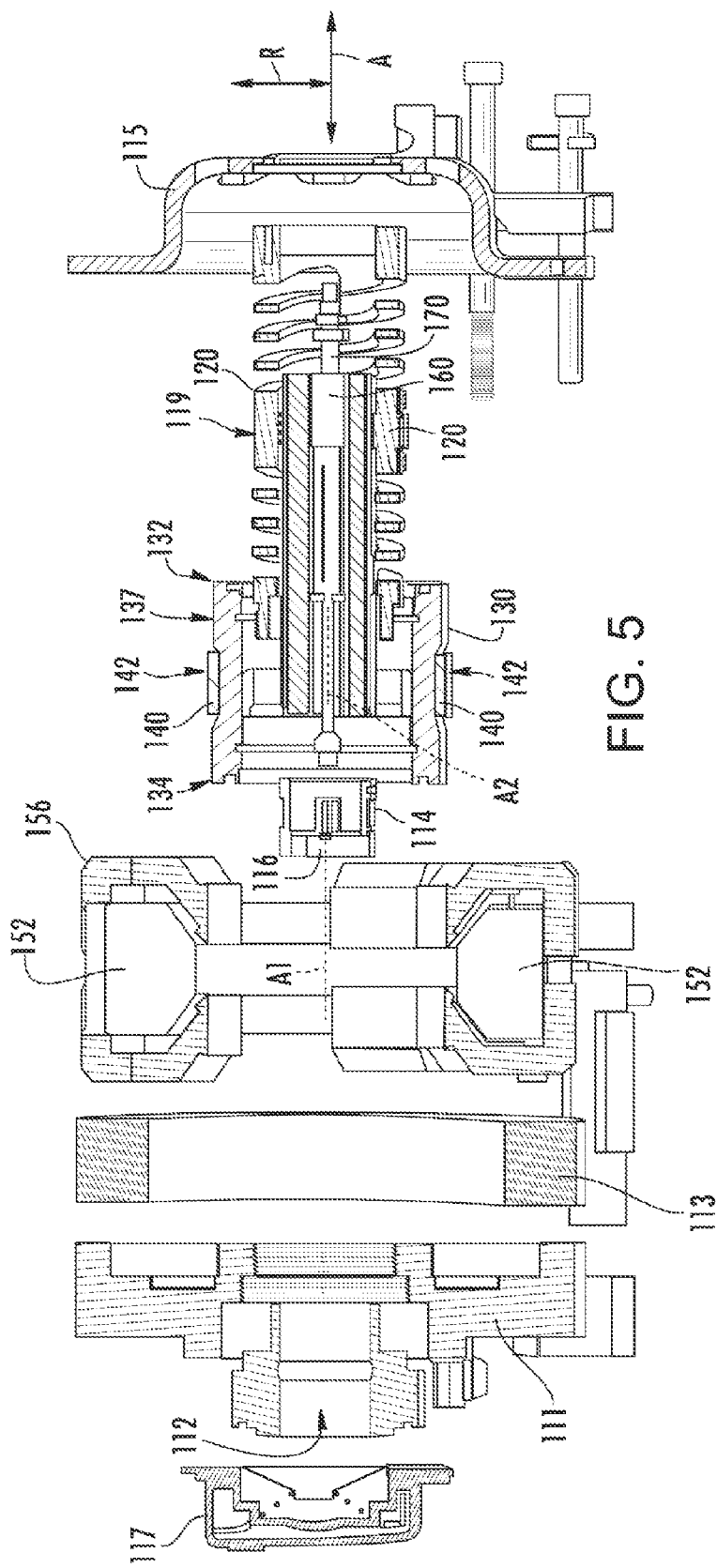
FIG. 5 provides an exploded view of the exemplary linear compressor of FIG. 4.

FIG. 3 provides a perspective view of a linear compressor 100 according to an exemplary embodiment of the present subject matter. FIG. 4 provides a side section view of linear compressor 100. FIG. 5 provides an exploded side section view of linear compressor 100. As discussed in greater detail below, linear compressor 100 is operable to increase a pressure of fluid within a chamber 112 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2). As may be seen in FIG. 3, linear compressor 100 defines an axial direction A, a radial direction R and a circumferential direction C. Linear compressor 100 may be enclosed within a hermetic or air-tight shell (not shown). The hermetic shell can, e.g., hinder or prevent refrigerant from leaking or escaping from refrigeration system 60.

Turning now to FIG. 4, linear compressor 100 includes a casing 110 that extends between a first end portion 102 and a second end portion 104, e.g., along the axial direction A. Casing 110 includes various static or non-moving structural components of linear compressor 100. In particular, casing 110 includes a cylinder assembly 111 that defines a chamber 112. Cylinder assembly 111 is positioned at or adjacent second end portion 104 of casing 110. Chamber 112 extends longitudinally along the axial direction A. Casing 110 also includes a motor mount mid-section 113 and an end cap 115 positioned opposite each other about a motor. A stator, e.g., including an outer back iron 150 and a driving coil 152, of the motor is mounted or secured to casing 110, e.g., such that the stator is sandwiched between motor mount mid-section 113 and end cap 115 of casing 110. Linear compressor 100 also includes valves (such as a discharge valve assembly 117 at an end of chamber 112) that permit refrigerant to enter and exit chamber 112 during operation of linear compressor 100.

A piston assembly 114 with a piston head 116 is slidably received within chamber 112 of cylinder assembly 111. In particular, piston assembly 114 is slidable along a first axis A1 within chamber 112. The first axis A1 may be substantially parallel to the axial direction A. During sliding of piston head 116 within chamber 112, piston head 116 compresses refrigerant within chamber 112. As an example, from a top dead center position, piston head 116 can slide within chamber 112 towards a bottom dead center position along the axial direction A, i.e., an expansion stroke of piston head 116. When piston head 116 reaches the bottom dead center position, piston head 116 changes directions and slides in chamber 112 back towards the top dead center position, i.e., a compression stroke of piston head 116. It should be understood that linear compressor 100 may include an additional piston head and/or additional chamber at an opposite end of linear compressor 100. Thus, linear compressor 100 may have multiple piston heads in alternative exemplary embodiments.

Linear compressor 100 also includes an inner back iron assembly 130. Inner back iron assembly 130 is positioned in the stator of the motor. In particular, outer back iron 150 and/or driving coil 152 may extend about inner back iron assembly 130, e.g., along the circumferential direction C. Inner back iron assembly 130 extends between a first end portion 132 and a second end portion 134, e.g., along the axial direction A.

Inner back iron assembly 130 also has an outer surface 137. At least one driving magnet 140 is mounted to inner back iron assembly 130, e.g., at outer surface 137 of inner back iron assembly 130. Driving magnet 140 may face and/or be exposed to driving coil 152. In particular, driving magnet 140 may be spaced apart from driving coil 152, e.g., along the radial direction R by an air gap AG. Thus, the air gap AG may be defined between opposing surfaces of driving magnet 140 and driving coil 152. Driving magnet 140 may also be mounted or fixed to inner back iron assembly 130 such that an outer surface 142 of driving magnet 140 is substantially flush with outer surface 137 of inner back iron assembly 130. Thus, driving magnet 140 may be inset within inner back iron assembly 130. In such a manner, the magnetic field from driving coil 152 may have to pass through only a single air gap (e.g., air gap AG) between outer back iron 150 and inner back iron assembly 130 during operation of linear compressor 100, and linear compressor 100 may be more efficient than linear compressors with air gaps on both sides of a driving magnet.

As may be seen in FIG. 4, driving coil 152 extends about inner back iron assembly 130, e.g., along the circumferential direction C. Driving coil 152 is operable to move the inner back iron assembly 130 along a second axis A2 during operation of driving coil 152. The second axis may be substantially parallel to the axial direction A and/or the first axis A1. As an example, driving coil 152 may receive a current from a current source (not shown) in order to generate a magnetic field that engages driving magnet 140 and urges piston assembly 114 to move along the axial direction A in order to compress refrigerant within chamber 112 as described above and will be understood by those skilled in the art. In particular, the magnetic field of driving coil 152 may engage driving magnet 140 in order to move inner back iron assembly 130 along the second axis A2 and piston head 116 along the first axis A1 during operation of driving coil 152. Thus, driving coil 152 may slide piston assembly 114 between the top dead center position and the bottom dead center position, e.g., by moving inner back iron assembly 130 along the second axis A2, during operation of driving coil 152.

A piston flex mount 160 is mounted to and extends through inner back iron assembly 130. A coupling 170 extends between piston flex mount 160 and piston assembly 114, e.g., along the axial direction A. Thus, coupling 170 connects inner back iron assembly 130 and piston assembly 114 such that motion of inner back iron assembly 130, e.g., along the axial direction A or the second axis A2, is transferred to piston assembly 114. Piston flex mount 160 defines an input passage 162 that permits refrigerant to flow therethrough.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 152 of the motor. Thus, the controller may selectively activate driving coil 152, e.g., by supplying voltage to driving coil 152, in order to compress refrigerant with piston assembly 114 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, field programmable gate arrays (FPGA), and the like) to perform control functionality instead of relying upon software.

Linear compressor 100 also includes a spring assembly 120. Spring assembly 120 is positioned in inner back iron assembly 130. In particular, inner back iron assembly 130 may extend about spring assembly 120, e.g., along the circumferential direction C. Spring assembly 120 also extends between first and second end portions 102 and 104 of casing 110, e.g., along the axial direction A. Spring assembly 120 assists with coupling inner back iron assembly 130 to casing 110, e.g., cylinder assembly 111 of casing 110. In particular, inner back iron assembly 130 is fixed to spring assembly 120 at a middle portion 119 of spring assembly 120.

During operation of driving coil 152, spring assembly 120 supports inner back iron assembly 130. In particular, inner back iron assembly 130 is suspended by spring assembly 120 within the stator or the motor of linear compressor 100 such that motion of inner back iron assembly 130 along the radial direction R is hindered or limited while motion along the second axis A2 is relatively unimpeded. Thus, spring assembly 120 may be substantially stiffer along the radial direction R than along the axial direction A. In such a manner, spring assembly 120 can assist with maintaining a uniformity of the air gap AG between driving magnet 140 and driving coil 152, e.g., along the radial direction R, during operation of the motor and movement of inner back iron assembly 130 on the second axis A2. Spring assembly 120 can also assist with hindering side pull forces of the motor from transmitting to piston assembly 114 and being reacted in cylinder assembly 111 as a friction loss.

Figure 6:
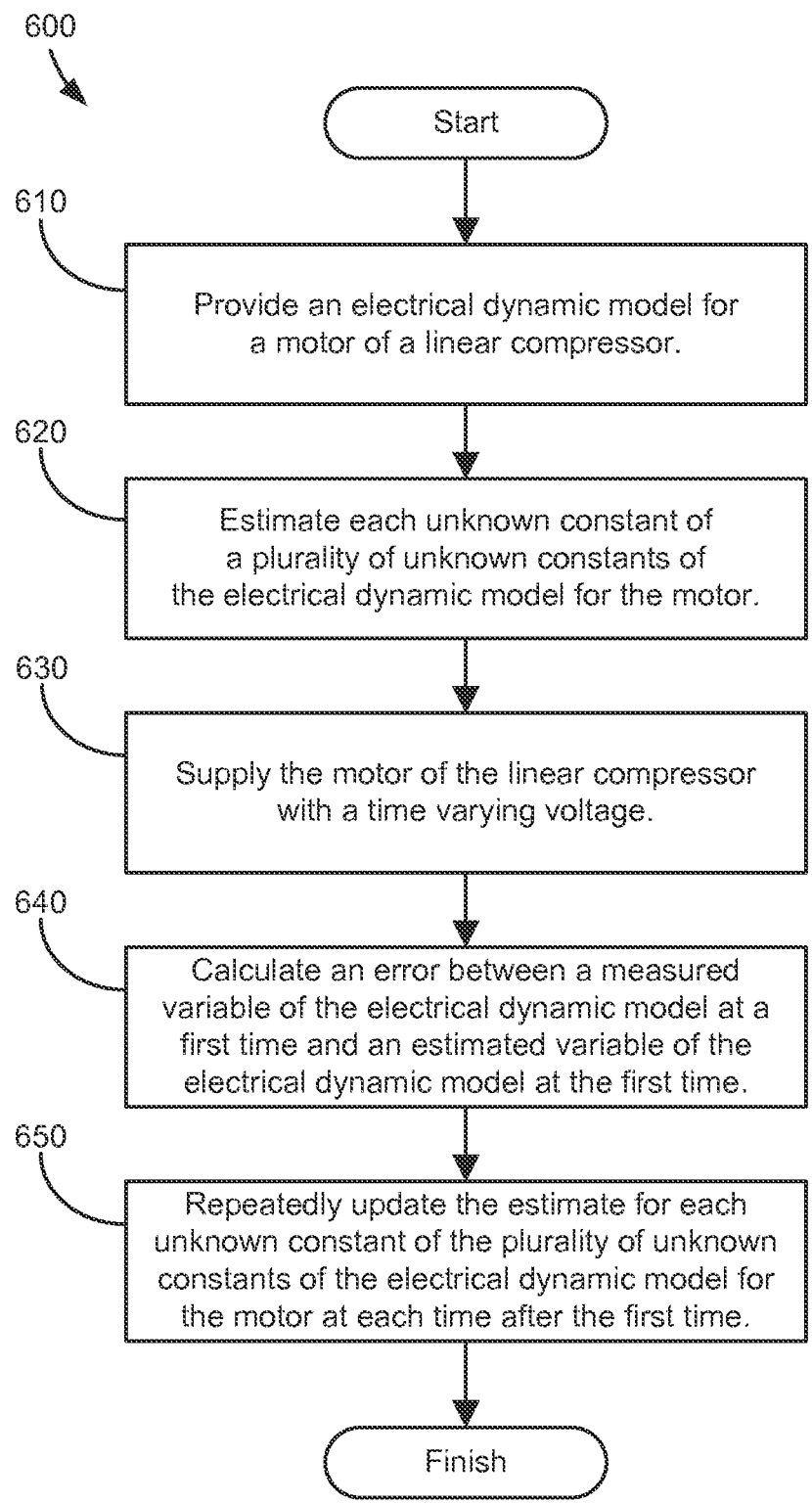
FIG. 6 illustrates a method for operating a linear compressor according to an exemplary embodiment of the present subject matter.

FIG. 6 illustrates a method 600 for operating a linear compressor according to an exemplary embodiment of the present subject matter. Method 600 may be used to operate any suitable linear compressor. For example, method 600 may be used to operate linear compressor 100 (FIG. 3). Thus, method 600 is discussed in greater detail below with reference to linear compressor 100. Utilizing method 600 various mechanical and electrical parameters or constants of linear compressor 100 may be established or determined. For example, method 600 may assist with determining or establishing a spring constant of spring assembly 120, a motor force constant of the motor of linear compressor 100, a damping coefficient of linear compressor 100, a resistance of the motor of linear compressor 100, an inductance of the motor of linear compressor 100, a moving mass (such as mass of piston assembly 114 and inner back iron assembly 130) of linear compressor 100, etc. Knowledge of such mechanical and electrical parameters or constants of linear compressor 100 may improve performance or operation of linear compressor 100, as will be understood by those skilled in the art.

At step 610, an electrical dynamic model for the motor of linear compressor 100 is provided. Any suitable electrical dynamic model for the motor of linear compressor 100 may be provided at step 610. For example, the electrical dynamic model for the motor of linear compressor 100 may be $$\frac{di}{dt} = \frac{v_a}{L_i} - \frac{r_i i}{L_i} - \frac{\alpha \dot{x}}{L_i}$$

where $v_a$ is a voltage across the motor of linear compressor 100;
$r_i$ is a resistance of the motor of linear compressor 100;
$i$ is a current induced in the motor of linear compressor 100;
$\alpha$ is a motor force constant;
$\dot{x}$ is a velocity of the motor of linear compressor 100; and
$L_i$ is an inductance of the motor of linear compressor 100.

The electrical dynamic model for the motor of linear compressor 100 includes a plurality of unknown constants. In the example provided above, the plurality of unknown constants of the electrical dynamic model for the motor of linear compressor 100 includes the resistance of the motor of linear compressor 100 (e.g., the resistance of driving coil 152), the inductance of the motor of linear compressor 100 (e.g., the inductance of driving coil 152), and the motor force constant. Knowledge or accurate estimates of such unknown constants can improve operation of linear compressor 100, e.g., by permitting operation of linear compressor 100 at a resonant frequency without head crashing.

At step 610, the electrical dynamic model for the motor of linear compressor 100 may also be solved for a particular variable, such as di/dt in the example provided above. Thus, as an example, the electrical dynamic model for the motor of linear compressor 100 may be provided in parametric form as $$\Phi \triangleq W\theta_e$$

where $$W \triangleq [\, v_a \quad -i \quad -\dot{x}\, ]; \text{ and}$$

$$\theta_e \triangleq \left[\, \frac{1}{L_i} \quad \frac{r_i}{L_i} \quad \frac{\alpha}{L_i}\, \right].$$

However, di/dt is difficult to accurately measure or determine. Thus, a filtering technique may be used to account for this signal and provide a useable or implementable signal. In particular, the electrical dynamic model for the motor of linear compressor 100 may be filtered, e.g., with a low-pass filter, to account for this signal. Thus, a filtered electrical dynamic model for the motor of linear compressor 100 may be provided as $$\Phi_f \triangleq W_f \theta_e.$$

In alternative exemplary embodiments, the electrical dynamic model for the motor of linear compressor 100 may be solved for $\dot{x}$ at step 610. Thus, the electrical dynamic model for the motor of linear compressor 100 may be provided in parametric form as $$\Phi \triangleq W\theta_e$$

where $$\Phi \triangleq \left[\frac{di}{dt}\right];$$

$$W \triangleq \left[\, v_a \quad -i \quad -\frac{di}{dt}\, \right]; \text{ and}$$

$$\theta_e \triangleq \left[\, \frac{1}{\alpha} \quad \frac{r_i}{\alpha} \quad \frac{L_i}{\alpha}\, \right].$$

Again, the electrical dynamic model for the motor of linear compressor 100 may be filtered, e.g., to account for di/dt.

At step 620, each unknown constant of the plurality of unknown constants of the electrical dynamic model for the motor of linear compressor 100 is estimated. For example, a manufacturer of linear compressor 100 may have a rough estimate or approximation for the value of each unknown constant of the plurality of unknown constants of the electrical dynamic model for the motor of linear compressor 100. Thus, such values of the each unknown constant of the plurality of unknown constants of the electrical dynamic model for the motor of linear compressor 100 may be provided at step 620 to estimate each unknown constant of the plurality of unknown constants of the electrical dynamic model for the motor of linear compressor 100.

At step 630, the motor (e.g., driving coil 152) of linear compressor 100 is supplied with a time varying voltage, e.g., by the controller of linear compressor 100. Any suitable time varying voltage may be supplied to the motor of linear compressor 100 at step 630. For example, the time varying voltage may have at least two frequencies components at step 630 when the electrical dynamic model for the motor of linear compressor 100 is solved for di/dt. Thus, the time varying voltage may be $$v_a(t) = v_0[\sin(2\pi f_1 t) + \sin(2\pi f_2 t)]$$

where $v_a$ is a voltage across the motor of linear compressor 100;
$f_1$ is a first frequency; and
$f_2$ is a second frequency.

The first and second frequencies $f_1$, $f_2$ may be about the resonant frequency of linear compressor 100. In particular, the first and second frequencies $f_1$, $f_2$ may be just greater than and just less than the resonant frequency of linear compressor 100, respectively. For example, the first frequency $f_1$ may be within five percent greater than the resonant frequency of linear compressor 100, and the second frequency $f_2$ may be within five percent less than the resonant frequency of linear compressor 100. In alternative exemplary embodiments, the time varying voltage may have a single frequency at step 630, e.g., when the electrical dynamic model for the motor of linear compressor 100 is solved for $\dot{x}$. When the time varying voltage has a single frequency at step 630, the gas force of fluid within linear compressor 100 may be incorporated within the model for the motor of linear compressor 100.

A time varying current through the motor of linear compressor 100 may also be determined, e.g., during step 630. An ammeter or any other suitable method or mechanism may be used to determine the time varying current through the motor of linear compressor 100. A velocity of the motor of linear compressor 100 may also be measured, e.g., during step 630. As an example, an optical sensor, a Hall effect sensor or any other suitable sensor may be positioned adjacent piston assembly 114 and/or inner back iron assembly 130 in order to permit such sensor to measure the velocity of the motor of linear compressor 100 at step 630. Thus, piston assembly 114 and/or inner back iron assembly 130 may be directly observed in order to measure the velocity of the motor of linear compressor 100 at step 630. In addition, a filtered first derivative of the current through the motor of linear compressor 100 with respect to time may also be measured or determined, e.g., during step 630. Accordingly, the values or filtered values of W may be measured during step 630. To permit such measuring, step 630 and the measurements described above may be conducted prior to sealing the motor of linear compressor 100 within a hermetic shell.

At step 640, an error between a measured variable (e.g., di/dt or $\dot{x}$) of the electrical dynamic model at a first time and an estimated variable of the electrical dynamic model at the first time is calculated. For example, an estimate of $\theta_e$, $\hat{\theta}_e$, is available, e.g., from step 620. An error between $\theta_e$ and $\hat{\theta}_e$ may be given as $$\tilde{\theta}_e \triangleq \theta_e - \hat{\theta}_e.$$

However, $\theta_e$ may be unknown while $\Phi_f$ is known or measured. Thus, a related error signal may be used at step 640. The related error signal may be given as $$\tilde{\Phi}_f \triangleq \Phi_f - \hat{\Phi}_f.$$

The related error signal along with $W_f$ may be used to update $\hat{\theta}_e$, as described in greater detail below.

At step 650, the estimate for each unknown constant of the plurality of unknown constants of the electrical dynamic model for the motor of linear compressor 100 are repeatedly updated at each time after the first time in order to reduce the error between a measured variable of the electrical dynamic model at each time after the first time and an estimated variable of the electrical dynamic model at each time after the first time. In particular, an adaptive least-squares algorithm may be utilized in order to drive the error between the measured value for the electrical dynamic model at each time after the first time and the estimated variable of the electrical dynamic model at each time after the first time towards zero. In particular, the Adaptive Least-Squares Update Law ensures that $$\tilde{\theta}_e(t) \to 0 \text{ as } t \to \infty:$$

$$\dot{\hat{\theta}}_e \triangleq -k_e \frac{P_e W_f^T \tilde{\Phi}_f}{1 + \gamma_e W_f P_e W_f^T},$$

$\hat{\theta}_e(t_0)$ is estimated, e.g., at step 620.
where $P_e(t) \in \Re^{3 \times 3}$ is the covariance matrix $$\dot{P}_e \triangleq -k_e \frac{P_e W_f^T W_f P_e}{1 + \gamma_e W_f W_f^T}, P_e(t_0) = \rho_e I_3$$

where $k_e, \gamma_e, \rho_e, \in \Re^+$ are constant gains.
From $\hat{\theta}_e$, estimates of each unknown constant of the plurality of unknown constants of the electrical dynamic model for the motor of linear compressor 100 may be given as $$\hat{\alpha} = \frac{\hat{\theta}_{e_3}}{\hat{\theta}_{e_1}}, \hat{R} = \frac{\hat{\theta}_{e_2}}{\hat{\theta}_{e_1}}, \hat{L} = \frac{1}{\hat{\theta}_{e_1}}$$

when the electrical dynamic model for the motor of linear compressor 100 is solved for di/dt at step 610 or $$\hat{\alpha} = \frac{1}{\hat{\theta}_{e_1}}, \hat{R} = \frac{\hat{\theta}_{e_2}}{\hat{\theta}_{e_1}}, \hat{L} = \frac{\hat{\theta}_{e_3}}{\hat{\theta}_{e_1}}$$

when the electrical dynamic model for the motor of linear compressor 100 is solved for $\dot{x}$ at step 610.

Figure 8:
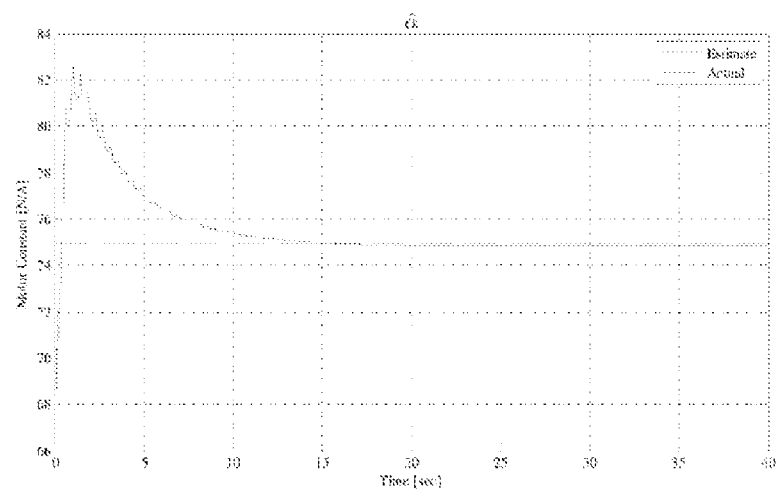
FIGS. 8, 9 and 10 illustrate exemplary plots of experimental electrical motor parameter estimates.
Figure 9:
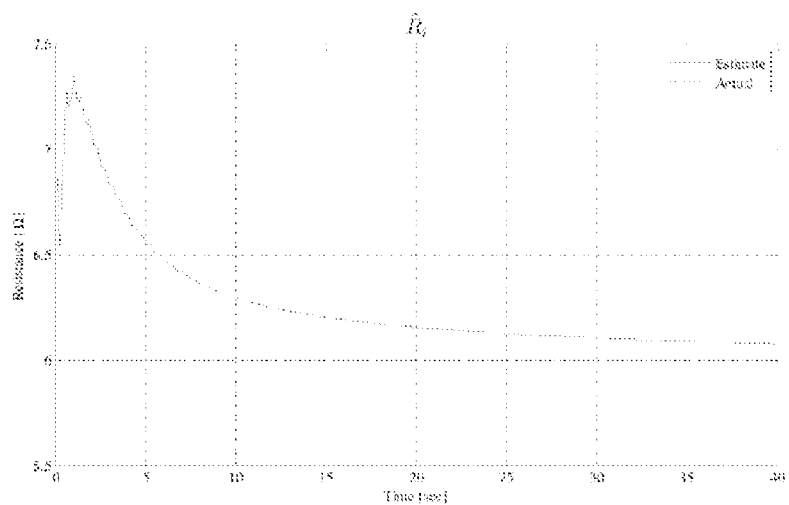
Figure 10:
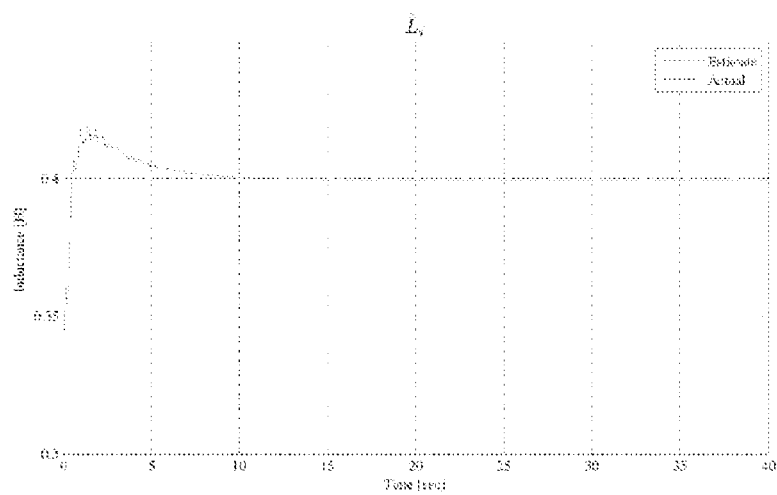

FIGS. 8, 9 and 10 illustrate exemplary plots of experimental electrical motor parameter estimates, e.g., taken during steps 640 and 650. As may be seen in FIGS. 8, 9 and 10, the initial estimate provided for the electrical motor parameters of linear compressor 100 may be off an actual or previously determined value. However, the experimental electrical motor parameter estimates converge to the previously determined values over time.

With the unknown constants of the electrical dynamic model for the motor of linear compressor 100 suitably estimated, a final estimate for each unknown constant of the plurality of unknown constants of the electrical dynamic model for the motor of linear compressor 100 may be saved within the controller of linear compressor 100. The saved constant values may be used to facilitate efficient and/or proper operation of linear compressor 100. In particular, knowledge of the constants of the electrical dynamic model for the motor of linear compressor 100 may assist with operating linear compressor 100 at a resonant frequency while avoiding head crashing.

As discussed above, method 600 may also provide estimates of the mechanical parameters or constants of linear compressor 100. Thus, method 600 may also include providing a mechanical dynamic model for linear compressor 100. Any suitable mechanical dynamic model for linear compressor 100 may be provided. For example, the mechanical dynamic model for linear compressor 100 may be $$F_m = i(t) = \frac{M}{\alpha} \ddot{x} + \frac{C}{\alpha} \dot{x} + \frac{K}{\alpha} x$$

where
M is a moving mass of linear compressor 100;
$\alpha$ is a motor force constant;
$\ddot{x}$ is an acceleration of the motor of linear compressor 100;
C is a damping coefficient of linear compressor 100;
$\dot{x}$ is a velocity of the motor of linear compressor 100;
K is a spring stiffness of linear compressor 100; and
x is a position of the moving mass of linear compressor 100.

The mechanical dynamic model for linear compressor 100 includes a plurality of unknown constants. In the example provided above, the plurality of unknown constants of the mechanical dynamic model of linear compressor 100 includes a moving mass of linear compressor 100 (e.g., a mass of piston assembly 114 and inner back iron assembly 130), a damping coefficient of linear compressor 100, and a spring stiffness of linear compressor 100 (e.g., a stiffness of spring assembly 120). Knowledge or accurate estimates of such unknown constants can improve operation of linear compressor 100, e.g., by permitting operation of linear compressor 100 at a resonant frequency without head crashing.

The mechanical dynamic model for linear compressor 100 may also be solved for a particular variable, such as i(t) in the example provided above. Thus, as an example, the electrical dynamic model for the motor of linear compressor 100 may be provided in parametric form as $$\Psi \triangleq Y\theta_m$$

where $$\Psi \triangleq [i];$$
$$Y \triangleq [\ddot{x} \ \dot{x} \ x]; \text{ and}$$
$$\theta_m \triangleq \left[\frac{M}{\alpha} \ \frac{C}{\alpha} \ \frac{K}{\alpha}\right]^T.$$

However, $\ddot{x}$ is difficult to accurately measure or determine. Thus, a filtering technique may be used to account for this signal and provide a measurable variable. In particular, the mechanical dynamic model for linear compressor 100 may be filtered, e.g., with a low-pass filter, to account for this signal. Thus, a filtered electrical dynamic model for the motor of linear compressor 100 may be provided as $$\Psi_f \triangleq Y_f \theta_m.$$

Each unknown constant of the plurality of unknown constants of the mechanical dynamic model for linear compressor 100 may also be estimated, and the motor (e.g., driving coil 152) of linear compressor 100 may be supplied with a time varying voltage, e.g., in the manner described above for steps 620 and 630.

An error between a measured variable of the mechanical dynamic model at the first time and an estimated variable of the mechanical dynamic model at the first time may also be calculated. For example, an estimate of $\theta_m$, $\hat{\theta}_m$, is available as discussed above. An error between $\theta_m$ and $\hat{\theta}_m$ may be given as $$\tilde{\theta}_m \triangleq \theta_m - \hat{\theta}_m.$$

However, $\theta_m$ may be unknown while $\Psi_f$ is known or measured. Thus, a related error signal may be used. The related error signal may be given as $$\tilde{\Psi}_f \triangleq \Psi_f - \hat{\Psi}_f$$

The related error signal along with $Y_f$ may be used to update $\hat{\theta}_m$, as described in greater detail below.

The estimate for each unknown constant of the plurality of unknown constants of the mechanical dynamic model for linear compressor 100 are repeatedly updated at each time after the first time in order to reduce the error between a measured variable of the mechanical dynamic model at each time after the first time and an estimated variable of the mechanical dynamic model at each time after the first time. In particular, an adaptive least-squares algorithm may be utilized in order to drive the error between the measured value for the mechanical dynamic model at each time after the first time and the estimated variable of the mechanical dynamic model at each time after the first time towards zero. In particular, the Adaptive Least-Squares Update Law ensures that $\tilde{\theta}_m(t) \to 0$ as $t \to \infty$:

$$\dot{\hat{\theta}}_m \triangleq -k_m \frac{P_m Y_f^T \tilde{\Psi}_f}{1 + \gamma_m Y_f P_m Y_f^T}, \hat{\theta}_m(t_0) \text{ is estimated.}$$

where $P_m(t) \in \Re^{3\times 3}$ is the covariance matrix $$\dot{P}_m \triangleq -k_m \frac{P_m Y_f^T Y_f P_m}{1 + \gamma_m Y_f Y_f^T}, P_m(t_0) = \rho_m I_3$$

where $k_m, \gamma_m, \rho_m \in \Re^+$ are constant gains.

From $\hat{\theta}_m$ and the estimate of the motor force constant from step 650, estimates of each unknown constant of the plurality of unknown constants of the mechanical dynamic model for linear compressor 100 may be given as $$\hat{M} = \hat{\alpha}\hat{\theta}_{m_1}, \hat{C} = \hat{\alpha}\hat{\theta}_{m_2}, \hat{K} = \hat{\alpha}\hat{\theta}_{m_3}.$$

With the unknown constants of the mechanical dynamic model for linear compressor 100 suitably estimated, a final estimate for each unknown constant of the plurality of unknown constants of the mechanical dynamic model for linear compressor 100 may be saved within the controller of linear compressor 100. The saved constant values may be used to facilitate efficient and/or proper operation of linear compressor 100. In particular, knowledge of the constants of the mechanical dynamic model for linear compressor 100 may assist with operating linear compressor 100 at a resonant frequency while avoiding head crashing.

Figure 7:
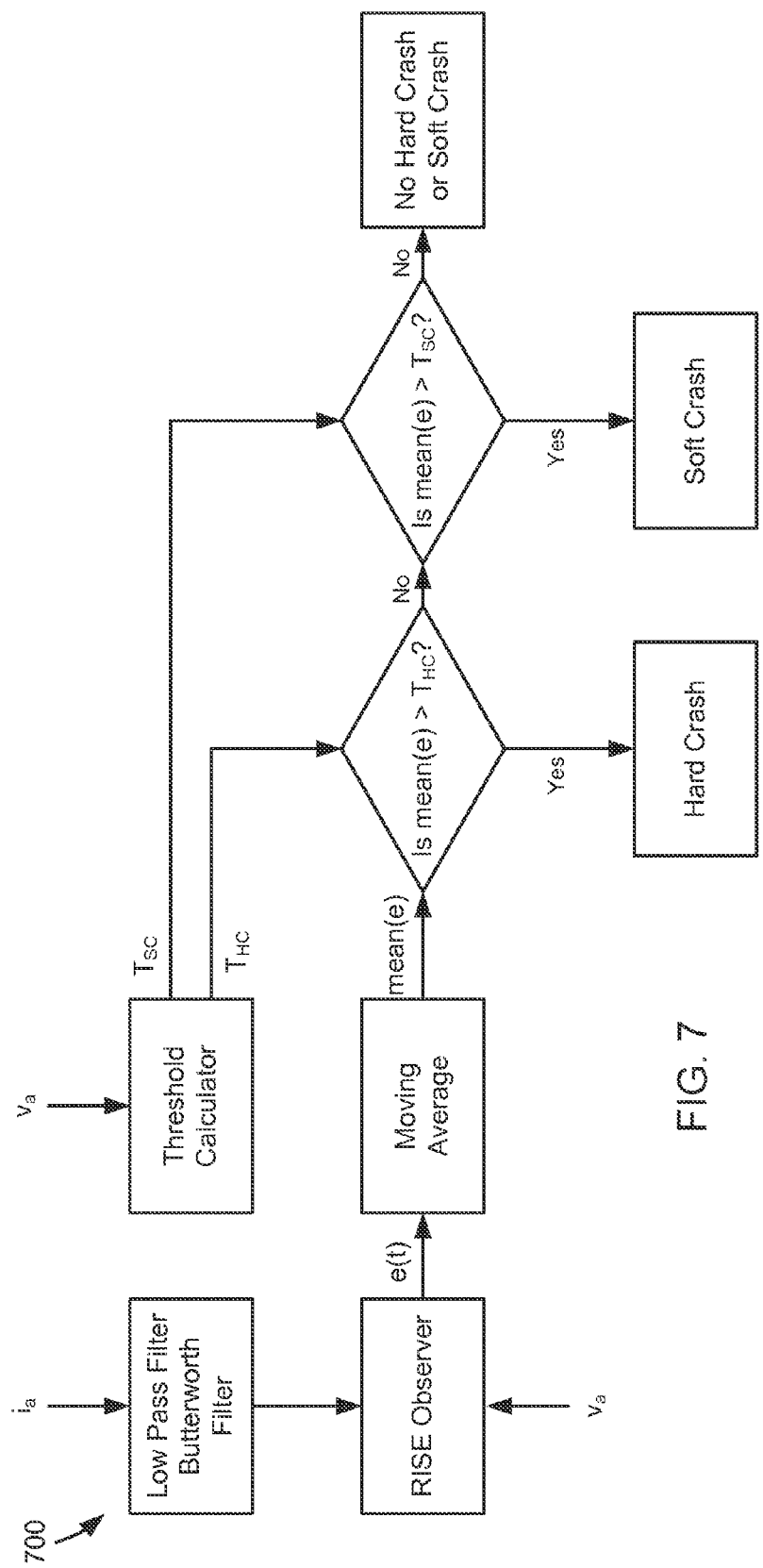
FIG. 7 illustrates a method for operating a linear compressor according to another exemplary embodiment of the present subject matter.

FIG. 7 illustrates a method 700 for operating a linear compressor according to another exemplary embodiment of the present subject matter. Method 700 may be used to operate any suitable linear compressor. For example, method 700 may be used to operate linear compressor 100 (FIG. 3). Thus, method 700 is discussed in greater detail below with reference to linear compressor 100. Utilizing method 700, a head crash (e.g., contact or impact between piston head 116 and discharge valve assembly 117) within linear compressor 100 may be detected. Detecting head crashes within linear compressor 100 may improve performance or operation of linear compressor 100, as will be understood by those skilled in the art.

As may be seen in FIG. 7, the motor (e.g., driving coil 152) of linear compressor 100 is supplied with a time varying voltage, $v_a$, e.g., by the controller of linear compressor 100. Any suitable time varying voltage $v_a$ may be supplied to the motor of linear compressor 100. As an example, the motor (e.g., driving coil 152) of linear compressor 100 may be supplied with a time varying voltage $v_a$ in the manner described above for step 630 of method 600. Method 700 also includes measuring or determining a time varying current $i_a$ induced in the motor of linear compressor 100, e.g., while the time varying voltage $v_a$ is supplied to the motor of linear compressor 100. An ammeter or any other suitable method or mechanism may be used to determine the time varying current $i_a$ induced in the motor of linear compressor 100. As shown in FIG. 7, the measured current $i_a$ induced in the motor of linear compressor 100 may be filtered, e.g., with a low pass or Butterworth filter.

Method 700 includes utilizing a robust integral of the sign of the error feedback (RISE) observer, e.g., within memory of the controller of linear compressor 100. The RISE observer utilizes at least an electrical dynamic model for the motor of linear compressor 100 and a mechanical dynamic model for the motor of linear compressor 100 to observe or estimate a current î through the motor of linear compressor 100. An error between the measured current $i_a$ induced in the motor of linear compressor 100 and the observed current î may be utilized to detect head crashing within linear compressor 100.

Thus, method 700 includes providing an electrical dynamic model for the motor of linear compressor 100. Any suitable electrical dynamic model for the motor of linear compressor 100 may be provided. For example, the electrical dynamic model for the motor of linear compressor 100 described above for method 600 may be used. A mechanical dynamic model for linear compressor 100 may also be provided. Any suitable mechanical dynamic model for linear compressor 100 may be provided. For example, the mechanical dynamic model for linear compressor 100 described above for method 600 may be used. As another example, the mechanical dynamic model for linear compressor 100 may be $$F_m = \alpha i + F_{gas} + F_{HC} = M\ddot{x} + C\dot{x} + K(x-x_0)$$

where
M is a moving mass of linear compressor 100;
α is a motor force constant;
ẍ is an acceleration of the motor of linear compressor 100;
C is a damping coefficient of linear compressor 100;
ẋ is a velocity of the motor of linear compressor 100;
K is a spring stiffness of linear compressor 100;
x is a position of the moving mass of linear compressor 100;
$F_{gas}$ is a gas force; and
$F_{HC}$ is a head crash force.

Solving for velocity, the mechanical dynamic model for linear compressor 100 shown above may be given as $$\dot{x} = -\frac{M}{C}\ddot{x} - \frac{K}{C}(x-x_0) + \frac{\alpha}{C}i + \frac{1}{C}F_{gas} + \frac{1}{C}F_{HC}.$$

During head crashes, a sudden change or discontinuity in system states for linear compressor 100 occurs. The discontinuities in the piston velocity can be shown with Dirac delta functions in acceleration ẍ and the head crash force $F_{HC}$. Thus, the head crash force $F_{HC}$ may be modeled with the following $$F_{HC} = \Sigma_n f_n \delta(t-t_n), n=1,2,\ldots$$

where
$t_n$ is a time of the $n^{th}$ crash; and
$f_n$ is a force of the $n^{th}$ crash.

For the RISE observer, the electrical dynamic model for linear compressor 100 and the mechanical dynamic model for linear compressor 100 may be combined. For example, the exemplary electrical and mechanical dynamic models for linear compressor 100 provided above may be combined to yield $$v_a = L_i \frac{di}{dt} + r_i i + \frac{\alpha^2}{C}i + \frac{\alpha}{C}F_{gas} + \frac{\alpha}{C}F_{HC} - \frac{\alpha M}{C}\ddot{x} - \frac{\alpha K}{C}(x-x_0).$$

L, $r_i$, α, M, C and K may be known or estimated, e.g., utilizing method 600, and $v_a$ may be measured or otherwise known during operation of linear compressor 100 (e.g., the time varying voltage $v_a$). The above combination of the exemplary electrical and mechanical dynamic models may be rewritten as $$\frac{di}{dt} = \frac{v_a}{L_i} - \frac{r_i i}{L_i} - w$$

where $$w = \frac{1}{L_i}\left(\frac{\alpha^2}{C}i + \frac{\alpha}{C}F_{gas} + \frac{\alpha}{C}F_{HC} - \frac{\alpha M}{C}\ddot{x} - \frac{\alpha K}{C}(x-x_0)\right).$$

As will be understood by those skilled in the art, |w(t)|, |w'(t)| and |w''(t)| are bounded, except at head crash events, $t=t_n$. With an accurate estimate of α and C, the above combination of the exemplary electrical and mechanical dynamic models may be rewritten as $$\frac{di}{dt} = \frac{v_a}{L_i} - \frac{r_i i}{L_i} - \frac{\alpha^2}{CL_i}i - w_1$$

where $$w_1 = \frac{1}{L_i}\left(\frac{\alpha}{C}F_{gas} + \frac{\alpha}{C}F_{HC} - \frac{\alpha M}{C}\ddot{x} - \frac{\alpha K}{C}(x-x_0)\right).$$

Utilizing the above, i' is estimated or observed, î', such that ŵ(t)→w(t) as t→∞. An expression relating î' to ŵ may be written as, $$\hat{i}' = \frac{v_a}{L_i} - \frac{r_i i}{L_i} - \hat{w}.$$

Error signals of the above expression may be given as $$e \triangleq \hat{i} - i;$$

and $$e' = \hat{i}' - i' = w - \hat{w} \triangleq \tilde{w},$$

where
ŵ is an estimation error.
If e'(t)→0 as t→∞ then ŵ(t) converges to w(t). Thus, spikes in e(t) may be indicative of head crashes. From the above, a filtered or virtual error may be given as $$s \triangleq e' + e.$$

In addition, a time derivative of the filtered error may be given as $$s' = e'' + e' = w' - \hat{w}' + e'.$$

For a stability analysis, a Lyapunov function may be defined as, $$V = \frac{1}{2}e^2 + \frac{1}{2}s^2$$

with a derivative of $$V' = ee' + ss' = -e^2 + s^2 + s(w' - \hat{w}').$$

In turn, ŵ'(t) may be given as $$\hat{w}' = (K_1+1)s + K_2 \, \text{sgn}(e)$$

where
$K_1$ and $K_2$ are real, positive gains; and
sgn is the signum or sign function.

With the above, V(t) and the error signals, e(t) and s(t), approach zero asymptotically, and e'(t) also approaches zero asymptotically when |w(t)|, |w'(t)| and |w''(t)| are bounded. Thus, e(t) may be monitored using at least the electrical dynamic model for the motor of linear compressor 100 and a robust integral of the sign of the error feedback (i.e., with the RISE observer of the controller of linear compressor 100). Large spikes or changes in e(t) may correspond violations of the assumption that |w(t)|, |w'(t)| and |w"(t)| are bounded, which occurs at or due to head crashes.

Thus, the RISE observer provides the observed current $\hat{i}$ through the motor of linear compressor 100. As an example, the observed current $\hat{i}$ through the motor of linear compressor 100 may be calculated with the RISE observer by solving $$\hat{i} = \frac{v_a}{L_i} - \frac{r_i i}{L_i} - (K_1 + 1)e(t) - \int_{t_0}^{t} [(K_1 + 1)e(\sigma) + K_2 \text{sgn}(e(\sigma))]d\sigma - (K_1 + 1)e(t_0).$$

As shown in FIG. 7, the RISE observer also determines or calculates the error between the observed current $\hat{i}$ of the motor of linear compressor 100 and the measured current $i_a$ induced in the motor of linear compressor 100. As an example, the error may correspond to a difference between the observed current $\hat{i}$ of the motor of linear compressor 100 and the measured current $i_a$ induced in the motor of linear compressor 100.

Method 700 also includes obtaining a moving average of the error between the observed current $\hat{i}$ of the motor of linear compressor 100 and the measured current $i_a$ to the motor of linear compressor 100. For example, the moving average may be taken over a period or window of about one millisecond. As used herein, the term "about" means within ten percent of the stated time when used in the context of times. Thus, it should be understood that the moving average of the error between the observed current $\hat{i}$ of the motor of linear compressor 100 and the measured current $i_a$ induced in the motor of linear compressor 100 may also be used within the subsequent steps method 700 described below rather than the actual values of the error between the observed current $\hat{i}$ of the motor of linear compressor 100 and the measured current $i_a$ induced in the motor of linear compressor 100. However, it should be understood that the moving average need not be performed in various exemplary embodiments.

As discussed above, large spikes or changes in the error may correspond to head crashes. Thus, a head crash is detected within linear compressor 100 if the error between the observed current $\hat{i}$ of the motor of linear compressor 100 and the measured current $i_a$ induced in the motor of linear compressor 100 is greater than a crash threshold.

The crash threshold may be any suitable value. For example, the crash threshold may be predetermined and stored within a memory of the controller of linear compressor 100. As another example and as shown in FIG. 4, method 700 may include calculating a soft crash threshold $T_{SC}$ and a hard crash threshold $T_{HC}$. The soft and hard crash thresholds $T_{SC}$, $T_{HC}$ may be functions of a peak voltage of the time varying voltage $v_a$ supplied to the motor of linear compressor 100. In particular, the soft crash threshold $T_{SC}$ may be calculated with the following $$T_{SC} = \left(\min\left\{\frac{V_{peak} - 194}{40} + 5*10^{-4}, 10^{-3}\right\}\right)*2*10^{-4}$$

where $V_{peak}$ is the peak voltage of the time varying voltage $v_a$ supplied to the motor of linear compressor 100.

Similarly, the hard crash threshold $T_{HC}$ may be calculated with the following $$T_{HC} = \left(\min\left\{\frac{V_{peak} - 194}{40} + 5*10^{-4}, 10^{-3}\right\}\right)*7*10^{-4}.$$

Again, it should be understood that the above formula for calculating the soft crash threshold $T_{SC}$ and the hard crash threshold $T_{HC}$ are provided by way of example only. In alternative exemplary embodiments, the soft crash threshold $T_{SC}$ and/or the hard crash threshold $T_{HC}$ may be constants, functions of voltage, functions of current, functions of current and voltage, etc.

Figure 11:
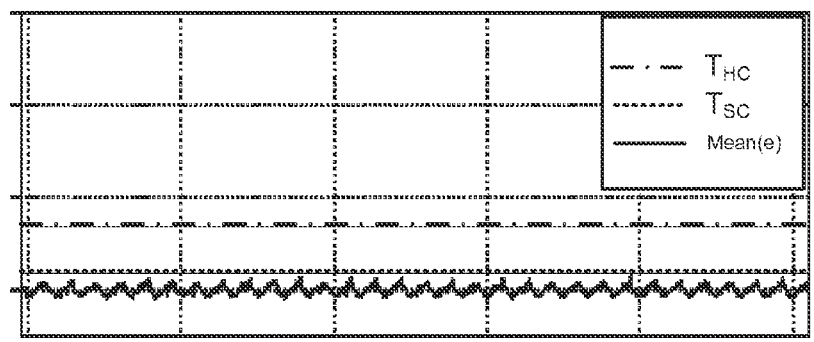
FIGS. 11, 12 and 13 illustrate exemplary plots of experimental head crash detection.
Figure 12:
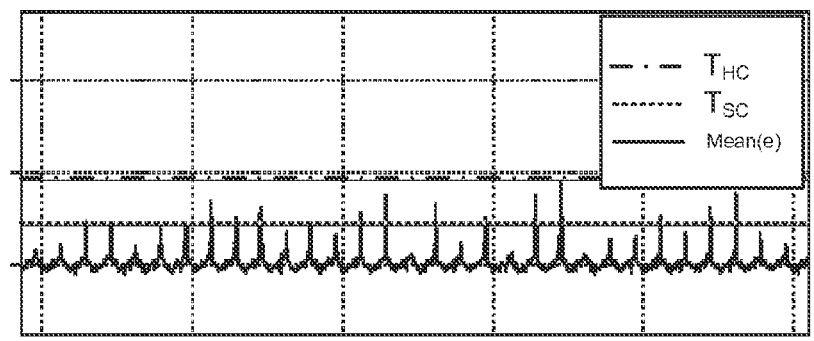
Figure 13:
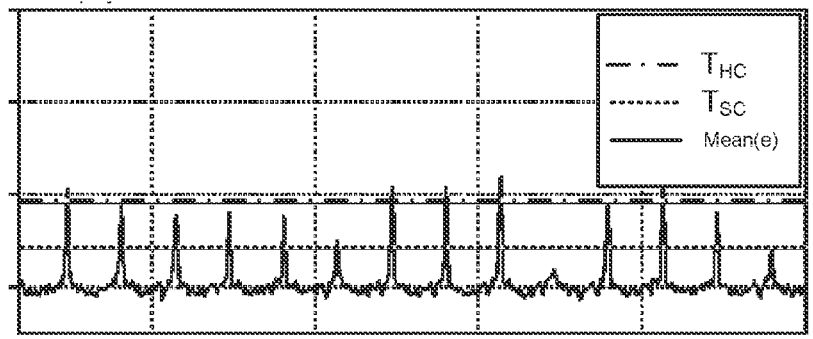

Detecting the head crash may include detecting a soft head crash if the error between the observed current $\hat{i}$ of the motor of linear compressor 100 and the measured current $i_a$ induced in the motor of linear compressor 100 is greater than the soft crash threshold $T_{SC}$. For example, as shown in FIG. 11, mean(e) is less than the soft crash threshold $T_{SC}$, thus method 700 does not detect head crashing in FIG. 10. Conversely, as shown in FIG. 12, mean(e) is greater than the soft crash threshold $T_{SC}$. Thus method 700 detects soft head crashing in FIG. 11. In addition, detecting the head crash may include detecting a hard head crash if the error between the observed current $\hat{i}$ of the motor of linear compressor 100 and the measured current $i_a$ induced in the motor of linear compressor 100 is greater than the hard crash threshold $T_{HC}$. Thus, as shown in FIG. 13, mean(e) is greater than the hard crash threshold $T_{HC}$. Thus, method 700 detects hard head crashing in FIG. 13.

It should be understood that method 700 may be performed with the motor of linear compressor 100 sealed within a hermitic shell of linear compressor 100. Thus, method 700 may be performed at any suitable time during operation of linear compressor 100 in order to detect head crashing of linear compressor 100, e.g., because moving components of linear compressor 100 need not be directly measured with a sensor. Knowledge of the head crashing within linear compressor 100 may assist with operating linear compressor 100 efficiently and/or properly. For example, such knowledge may assist with adjusting the time varying voltage supplied to the motor of the linear compressor 100 in order to operate the motor of linear compressor 100 at a resonant frequency of the motor of linear compressor 100 without or limited head crashing, e.g., as will be understood by those skilled in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a linear compressor, comprising:

supplying a motor of the linear compressor with a time varying voltage;

measuring a current induced in the motor of the linear compressor during said step of supplying;

calculating an observed current of the motor of the linear compressor using at least an electrical dynamic model for the linear compressor and a robust integral of the sign of the error feedback;

determining an error between the observed current of the motor of the linear compressor and the measured current induced in the motor of the linear compressor;

calculating a soft crash threshold and a hard crash threshold based at least in part on a peak voltage of the time varying voltage supplied to the motor of the linear compressor; and detecting a head crash within the linear compressor if an error between the observed current of the motor of the linear compressor and the measured current induced in the motor of the linear compressor is greater than a crash threshold.

2. The method of claim 1, wherein the soft crash threshold is calculated with the following $$T_{SC} = \left(\min\left\{\frac{V_{peak} - 194}{40} + 5*10^{-4}, 10^{-3}\right\}\right)*2*10^{-4}$$

where
$T_{SC}$ is the soft crash threshold, and
$V_{peak}$ is the peak voltage of the time varying voltage supplied to the motor of the linear compressor.

3. The method of claim 1, wherein the hard crash threshold is calculated with the following $$T_{HC} = \left(\min\left\{\frac{V_{peak} - 194}{40} + 5*10^{-4}, 10^{-3}\right\}\right)*7*10^{-4}$$

where
$T_{HC}$ is the hard crash threshold, and
$V_{peak}$ is the peak voltage of the time varying voltage supplied to the motor of the linear compressor.

4. The method of claim 1, wherein said step of detecting the head crash comprises detecting a soft head crash if the error between the observed current of the motor of the linear compressor and the measured current induced in the motor of the linear compressor is greater than the soft crash threshold and detecting a hard head crash if the error between the observed current of the motor of the linear compressor and the measured current induced in the motor of the linear compressor is greater than the hard crash threshold.

5. The method of claim 1, wherein said step of detecting the head crash further comprises detecting no head crash within the linear compressor if the error between the observed current of the motor of the linear compressor and the measured current induced in the motor of the linear compressor is less than the crash threshold.

6. The method of claim 1, further comprising obtaining a moving average of the error between the observed current of the motor of the linear compressor and the measured current induced in the motor of the linear compressor.

7. The method of claim 6, wherein said step of detecting the head crash comprises detecting the head crash if the moving average of the error between the observed current of the motor of the linear compressor and the measured current induced in the motor of the linear compressor is greater than the crash threshold.

8. The method of claim 1, further comprising filtering the measured current induced in the motor of the linear compressor.

9. A method for operating a linear compressor, comprising:
supplying a motor of the linear compressor with a time varying voltage;
measuring a current to the motor of the linear compressor during said step of supplying;
filtering the measured current induced in the motor of the linear compressor;
calculating an observed current of the motor of the linear compressor using at least an electrical dynamic model for the linear compressor and a robust integral of the sign of the error feedback;
determining an error between the observed current of the motor of the linear compressor and the measured current induced in the motor of the linear compressor;
obtaining a moving average of the error between the observed current of the motor of the linear compressor and the measured current induced in the motor of the linear compressor;
calculating a soft crash threshold and a hard crash threshold based at least in part on a peak voltage of the time varying voltage supplied to the motor of the linear compressor; and
detecting a head crash within the linear compressor if the moving average of an error between the observed current of the motor of the linear compressor and the measured current induced in the motor of the linear compressor is greater than a crash threshold.

10. The method of claim 9, wherein the soft crash threshold is calculated with the following $$T_{SC} = \left(\min\left\{\frac{V_{peak} - 194}{40} + 5*10^{-4}, 10^{-3}\right\}\right)*2*10^{-4}$$

where
$T_{SC}$ is the soft crash threshold, and
$V_{peak}$ is the peak voltage of the time varying voltage supplied to the motor of the linear compressor.

11. The method of claim 9, wherein the hard crash threshold is calculated with the following $$T_{HC} = \left(\min\left\{\frac{V_{peak} - 194}{40} + 5*10^{-4}, 10^{-3}\right\}\right)*7*10^{-4}$$

where
$T_{HC}$ is the hard crash threshold, and
$V_{peak}$ is the peak voltage of the time varying voltage supplied to the motor of the linear compressor.

12. The method of claim 9, wherein said step of detecting the head crash comprises detecting a soft head crash if the error between the observed current of the motor of the linear compressor and the measured current induced in the motor of the linear compressor is greater than the soft crash threshold and detecting a hard head crash if the error between the observed current of the motor of the linear compressor and the measured current induced in the motor of the linear compressor is greater than the hard crash threshold.

13. The method of claim 9, wherein said step of detecting the head crash further comprises detecting no head crash within the linear compressor if the error between the observed current of the motor of the linear compressor and the measured current induced in the motor of the linear compressor is less than the crash threshold.

14. The method of claim 9, wherein a period of the moving average is about one millisecond.

* * * * *